United States Patent [19]

Rahman et al.

[11] Patent Number: 5,805,878
[45] Date of Patent: Sep. 8, 1998

[54] METHOD AND APPARATUS FOR GENERATING BRANCH PREDICTIONS FOR MULTIPLE BRANCH INSTRUCTIONS INDEXED BY A SINGLE INSTRUCTION POINTER

[75] Inventors: Monis Rahman, San Jose; Tse-Yu Yeh, Milpitas; Mircea Poplingher, Campbell; Carl C. Scafidi, Sunnyvale; Ashish Choubal, Santa Clara, all of Calif.

[73] Assignee: Intel Corporation, Santa Clara, Calif.

[21] Appl. No.: 792,115

[22] Filed: Jan. 31, 1997

[51] Int. Cl.⁶ .................................................. G06F 9/40
[52] U.S. Cl. .................................................. 395/586
[58] Field of Search .................................. 395/376, 586, 395/587, 580

[56] References Cited

U.S. PATENT DOCUMENTS 5,093,778  3/1992  Favor et al. ............................. 395/375
5,687,360  11/1997  Chang ..................................... 395/587

Primary Examiner—David Y. Eng
Attorney, Agent, or Firm—Blakely, Sokoloff, Taylor & Zafman

[57] ABSTRACT

A method and apparatus for generating respective branch predictions for first and second branch instructions, both indexed by a first instruction pointer, is disclosed. The apparatus includes dynamic branch prediction circuitry for generating a branch prediction based on the outcome of previous branch resolution activity, as well as static branch prediction circuitry configured to generate a branch prediction based on static branch prediction information. Prediction output circuitry, coupled to the both the dynamic and static branch prediction circuitry, outputs the respective branch predictions for the first and second branch instructions in first and second clock cycles to an instruction buffer (or "rotator"). Specifically, the prediction output control circuitry outputs the branch prediction for the second branch instruction in the second clock cycle and in response to the initiation of a recycle stall during the first clock cycle. The receipt of the predictions and their corresponding branch instructions at the instruction buffer is thus synchronized, and the opportunity of generating a prediction for the second branch instruction is not lost.

33 Claims, 11 Drawing Sheets

METHOD AND APPARATUS FOR GENERATING BRANCH PREDICTIONS FOR MULTIPLE BRANCH INSTRUCTIONS INDEXED BY A SINGLE INSTRUCTION POINTER

FIELD OF THE INVENTION

The present invention pertains to the generation of branch predictions in a microprocessor. More particularly, the present invention relates to a method and apparatus for generating branch predictions for multiple branch instructions indexed as a group by a single instruction pointer.

BACKGROUND OF THE INVENTION

It is well known for microprocessors to employ pipelining to enhance performance. In a pipelined microprocessor, various functional units for performing different functions on an instruction operate simultaneously on multiple instructions, thus allowing the microprocessor to achieve increased levels of performance. For example, an instruction fetcher, an instruction decoder and instruction execution units may all perform their designated functions on multiple instructions in a simultaneous manner. During any clock cycle, the instruction execution units may be executing a first instruction, while the instruction decoder decodes a second instruction and the fetcher fetches a third instruction. In a subsequent clock cycle, the execution unit will receive the decoded second instruction from the instruction decoder, and proceed to execute the second instruction, while the decoder receives the third instruction from the fetcher and the fetcher retrieves yet a further instruction. In this manner, the various functional units of the microprocessor are prevented from stalling as a result of the lack of availability of instructions on which to perform their designated functions. A deeper degree of pipelining can be achieved by subdividing the broad functions performed by each of the functional units of the microprocessor into higher resolution pipe stages.

A pipelined microprocessor operates most efficiently when instructions are executed in the order in which they appear in memory as a program. However, computer programs typically include a large number of branch instructions which, upon execution, may cause instructions to be executed in a sequence other than the order in which they appear in memory. Specifically, when a branch instruction is executed, execution continues either with the next sequential instruction from memory or execution jumps to an instruction located at a "branch target" address.

A branch instruction is classified as being "taken" if conditions set by the branch instruction are met and the branch instruction causes the execution sequence to jump to a branch target instruction address. On the other hand, a branch instruction is said to be "not taken" if execution continues with the next sequential instruction in memory.

A branch instruction may furthermore be classified as being either conditional or unconditional. An unconditional branch is taken every time the instruction is executed, while a conditional branch is either "taken" or "not taken" depending on the resolution of a condition presented by the branch instruction. Instructions to be executed subsequent to the execution of a branch instruction cannot be identified with any absolute certainty until a condition presented by the branch instruction is resolved. However, rather than wait for the relevant condition to be resolved, microprocessors may attempt to perform a branch prediction. Specifically, the microprocessor may attempt to predict, or "guess", whether a branch instruction will be "taken" or "not taken" and, if taken, to predict a target address for the branch instruction. If the branch instruction is predicted to be "not taken", the microprocessor retrieves and speculatively executes the next instructions in memory. If the branch instruction is predicted to be "taken", the microprocessor fetches and speculatively executes instructions located at and beyond a predicted branch target address. The instructions processed through the pipe stages of a microprocessor following a speculatively predicted branch prediction are termed "speculative instructions", as at the time of processing of these instructions, it is unknown whether the results generated thereby will in fact be valid. Accordingly, operations performed by the speculative instructions can often be discarded for a number reasons. For example, if a memory write operation is executed speculatively, the results of the write operation cannot be written to external memory until all branch instructions, upon which the execution of the memory write instruction is dependent, are resolved. This is because the write instruction may improperly alter the contents of memory based on a mispredicted branch. If the branch prediction is ultimately determined to be correct, the speculative instructions can be "retired". For the memory write example given above, the results of the write operation can then be written to external memory. On the other hand, if the branch prediction is eventually found to be incorrect, then speculative instructions processed as a result of the mispredicted branch are discarded, or "flushed" from the microprocessor. As will readily be appreciated, when a branch prediction is correct, a considerable windfall in microprocessor performance is gained, as the microprocessor was not stalled pending the resolution of a branch condition.

A number of methods of performing branch predictions currently exist. One such method requires the maintenance of tables which have entries providing an indication of the history of branch instructions executed within the microprocessor. For example, a table may include an entry for all branch instructions encountered within the microprocessor, and a record of whether a branch condition presented by each branch instruction was taken or not taken. Such tables may also contain entries storing a history of earlier branch predictions for each such branch instruction, and whether or not these earlier predictions were correct or incorrect. The maintenance of such tables allows the microprocessor to generate predictions for branch instructions by evaluating whether the relevant branch condition was previously resolved to be "taken" or "not taken", and/or whether an earlier prediction proved to be correct or incorrect. For some microprocessors, the circuitry for performing such branch predictions is complex and slow. For a number of reasons, it is desirable that the branch prediction process be completed as quickly as possible. Specifically, branch predictions should be generated at the same rate at which a fetcher issues instructions to a decoder, to thereby ensure that the fetcher does not stall while waiting for the outcome of branch prediction activity.

In order to expedite the branch prediction process, a branch prediction table (BPT) may be maintained within branch prediction circuitry to provide a cache for recent branch predictions. Referring now to FIG. 1, there is illustrated a portion of a microprocessor 10 incorporating branch prediction circuitry 12. The branch prediction circuitry 12 includes a branch prediction table (BPT) 14. The microprocessor 10 further includes an instruction pointer (IP) generator 16 and a fetcher 18. The fetcher 18 retrieves instructions, indexed by an instruction pointer (IP) generated by the IP generator 16, from an instruction cache 20 or from main memory via a bus interface unit 22. The fetcher 18 then propagates retrieved instructions to an instruction buffer (IB) 24, where the instructions are buffered prior to being forwarded to the instruction decode and execute circuitry 26.

As illustrated in FIG. 1, an instruction pointer, identifying a new instruction to be retrieved, is presented simultaneously to the fetcher 18 and to the BPT 14. While the fetcher 18 retrieves the instruction indexed by the instruction pointer, a determination is made as to whether an entry for the instruction referenced by the instruction pointer is present in the BPT 14 (i.e. whether there is a "hit" in the BPT 14). This determination may be made using a tag value, which comprises part of the instruction pointer. Initially, the BPT 14 is empty, and a MISS signal is generated. An instruction pointer (IP) increment unit 28 receives the MISS signal, and increments the instruction pointer to identify the next sequential instruction of the program in memory. The incremented instruction pointer is then propagated to the instruction pointer generator 16, which in turn outputs the incremented instruction pointer. In other words, when the BPT 14 generates a MISS signal, the microprocessor 10 assumes that either the instruction indexed by the instruction pointer is not a branch instruction or, if it is a branch instruction, that the branch instruction will not be taken. The incremented instruction pointer is then propagated from the instruction pointer generator 16 back to the fetcher 18 and the BPT 14, and the process described above is repeated. Instructions retrieved by the fetcher 18 are forwarded to the instruction buffer 24 (also termed a "rotator"), and then propagated to the instruction decode and execute circuitry 26. The instruction decode and execute circuitry 26 will encounter and process a number of branch instructions in the course of executing a program. The instruction decode and execute circuitry 26 includes branch resolution circuitry 27, which is responsible for the resolution of qualifying conditions presented by branch instructions. For each branch instruction encountered, the branch resolution circuitry 27 causes the BPT allocation circuitry to update the BPT 14 contents by allocating an entry within the BPT 14 to the relevant branch instruction. The BPT allocation circuitry 30 furthermore writes prediction information into each entry in the BPT 14, which can then be utilized by a branch prediction logic unit 32 to predict whether the relevant branch instruction will be "taken" or "not taken" when next encountered in the instruction stream. The branch prediction logic unit 32 may indicate a prediction within an entry in the BPT 14, for example, by setting a prediction bit to one or zero.

As execution of a computer program continues, it will be appreciated that more and more entries are allocated within the BPT 14. Eventually, an instruction pointer (or at least a tag portion thereof) from the IP generator 16 will correspond to an entry within the BPT 14, and a hit will have occurred. The BPT 14 then outputs a prediction of either "taken" or "not taken" based on the state of the prediction bit discussed above. If the prediction is "not taken", then the IP increment unit 28 is activated to increment the IP by one, and to propagate a speculative instruction pointer to the IP generator 16. If the prediction is "taken", then a branch target address prediction unit 34 is activated to provide a speculative branch target address. The branch target address is specified within the branch instruction itself. The branch target address generated by the prediction unit 34 is propagated to the IP generator 16, from which it is re-circulated to the fetcher 18 and the BPT 14.

Instructions fetched by fetcher 18 are forwarded to the instruction decode and execute circuitry 26 for decoding and execution. Instructions fetched after a speculatively predicted branch instruction are regarded as being speculative, until the conditions set by the relevant branch instruction are resolved. Specifically, conditions set by branch instructions are resolved and evaluated within the instruction decode and execute circuitry 26. Should it transpire that the branch prediction was correct, then the speculatively processed instructions are retired or otherwise committed. Alternatively, should it transpire that a relevant branch prediction was incorrect, then all instructions speculatively processed by functional units of the microprocessor are discarded or flushed from the microprocessor. In either case, an entry within the BPT 14 corresponding to the relevant branch instruction is updated to reflect the accuracy or inaccuracy of the prediction. Depending on the implementation, each entry within BPT 14 may reflect a history of branch predictions and the accuracy thereof. Additional tables accessed by the branch prediction circuitry 32, but not specifically discussed herein, may also be updated. In order to allow the downstream instruction decode and execute circuitry 26 to evaluate whether a branch instruction was correctly predicted, it is necessary to associate an indication of the prediction with each speculatively predicted branch instruction. Accordingly, a prediction provided from the BPT 14 is also provided to the instruction buffer 24, and associated with each speculatively executed branch instruction therein.

The BPT 14 provides a cache for prediction information for branch instructions of an executing computer program. It will be appreciated that the BPT 14 is of limited size, and that entries may accordingly need to be de-allocated in order to make room for new entries corresponding to newly encountered branch instructions. It may thus occur that the BPT 14 receives an instruction pointer corresponding to a previously predicted branch instruction for which there is no entry in the BPT 14, as a result of the appropriate entry having been de-allocated. In this case, the branch prediction circuitry 12 may nonetheless generate a prediction utilizing other means associated with the branch prediction circuitry 12. In other words, the branch prediction process is not limited to branch instructions having entries allocated within the BPT 14.

With the appearance of instruction caches which store two or more instructions per cache line, the above described structures encounter a number of inadequacies. In architectures including instruction cache lines each capable of storing more than a single instruction, the fetcher is capable of simultaneously retrieving all instructions contained in an instruction cache line, thus providing a performance advantage. To achieve this, the instruction pointer is interpreted as indexing a cache line storing multiple instructions. In such architectures, instructions may further be included in data structures referred to in the art as "bundles" and a single cache line may include two or more bundles, each bundle including one or more instructions. The fetcher 18 then issues instructions to the instruction buffer 24. It will be appreciated that, where the instruction pointer is used simultaneously to index multiple instructions, the instruction pointer must be advanced by more than a single increment to reference a subsequent group of multiple instructions (which may be stored in a single cache line). Accordingly, it is conceivable that the instruction pointer, when advanced to point to a next instruction cache line, may skip, or jump, an entry in the BPT 14. For example, consider the scenario in which consecutive instruction cache lines are respectively index by the values IP and IP+2. In this case, an entry in the BPT 14 corresponding to the value IP+1 may be overlooked as the instruction pointer is advanced from the value IP to the value IP+2. This is undesirable, as the performance benefit that may have resulted from a prediction for the branch instruction at IP+1 is lost.

Assuming that predictions for each branch instruction in a group of instructions, indexed as a group, are all retrieved, the task of ordering and outputting of these predictions also presents a number of problems. For example, the propagation of a branch instruction, and the prediction therefore, to the instruction buffer 24 is complicated in view of the fact that instructions are written one by one and in a serial fashion to the instruction buffer 24.

SUMMARY OF THE INVENTION

According to a first aspect of the invention there is provided a computer-implemented method of generating respective branch predictions, in a microprocessor, for first and second branch instructions. Both the first and second branch instructions are indexed by a first instruction pointer. The method requires generating a first branch prediction for the first branch instruction. If the first branch is predicted as being not taken, then a number of actions are performed. In a first clock cycle, a recycle stall is initiated during which the first instruction pointer is stalled. The first branch prediction is then propagated to an instruction buffer. A second branch prediction for the second branch instruction is then generated and, in a second clock cycle, the second branch prediction is propagated to the instruction buffer in response to the initiation of the recycle stall in the first clock cycle.

A recycle stall signal may be toggled in response to the initiation of the recycle stall.

The first and second branch predictions may be respectively propagated to the instruction buffer in successive clock cycles.

In one embodiment, the generation of the first branch prediction and the initiation of the recycle stall occur in the first clock cycle, and the recycle stall is terminated and the generation of the second branch prediction occur in the second clock cycle.

In a first scenario, the first and second branch predictions are static branch predictions not based on previous branch resolution activity, and the generation of the second branch prediction and the propagation of the second branch prediction to the instruction buffer occur in the same clock cycle.

In a second scenario, the first branch prediction is a dynamic branch prediction based on the outcome of previous branch resolution activity within the microprocessor, and the method includes the step of toggling a dynamic prediction valid signal in response to the generation of the first branch prediction.

The microprocessor may include dynamic branch prediction circuitry configured to generate a dynamic branch prediction based on the outcome of previous branch resolution activity, and static branch prediction circuitry configured to generate a static branch prediction based on static branch prediction information. The method may include the step of preventing the static branch prediction circuitry from propagating a static branch prediction to the instruction buffer when a dynamic branch prediction is generated for a branch instruction.

The microprocessor may also include an instruction cache having an instruction cache line, indexed by the first instruction pointer, storing both the first and second branch instructions. The recycle stall may furthermore be initiated if the both the first and second branch instructions are identified as being branch instructions. The microprocessor may also include a branch prediction table having an entry for the first branch instruction, the branch prediction table entry including a double branch indicator identifying both the first and second branch instructions as branch instructions. The first and second branch instructions may also each be identified as being a branch instruction by static branch prediction circuitry.

The generation of a dynamic branch prediction may require referencing a branch prediction table containing entries for branch instructions previously resolved. When the second branch prediction is a dynamic branch prediction, and when there is no entry in the branch prediction table for the first branch instruction, a quasi-dynamic prediction for the first branch instruction may be generated, the quasi-dynamic prediction indicating the first branch instruction as being not taken.

According to a second aspect of the invention there is provided apparatus for generating respective branch predictions for first and second branch instructions, both indexed by a first instruction pointer. The apparatus includes dynamic branch prediction circuitry configured to generate a branch prediction based on the outcome of previous branch resolution activity, as well as static branch prediction circuitry configured to generate a branch prediction based on static branch prediction information. Prediction output circuitry, coupled to the both the dynamic and static branch prediction circuitry, outputs the respective branch predictions for the first and second branch instructions in first and second clock cycles to an instruction buffer (or "rotator"). Specifically, the prediction output control circuitry outputs the branch prediction for the first branch instruction in the first clock cycle, and outputs the branch prediction for the second branch instruction in the second clock cycle and in response to the initiation of the recycle stall in the first clock cycle.

In one embodiment, the static prediction information comprises a prediction for a branch instruction determined by a compiler at compilation of the branch instruction.

The prediction output control circuitry may include recycle stall circuitry which initiates a recycle stall, during which the first instruction pointer is stalled, when the instruction pointer indexes the first and second branch instructions and when the first branch instruction is predicted as being not taken.

According to a third aspect of the invention there is provided apparatus for performing branch predictions for first and second branch instructions, both indexed by a first instruction pointer. The apparatus includes branch prediction circuitry which generates first and second branch predictions for the first and second branch instructions respectively, and prediction output control circuitry configured, if the first branch instruction is predicted as being not taken, to perform two primary functions. Specifically, the output control circuitry propagates the first branch prediction to an instruction buffer in a first clock cycle (for example in response to the initiation of a recycle stall during which the first instruction pointer is stalled), and then propagates the second branch prediction to the instruction buffer in a second clock cycle (for example in response to the initiation of the recycle stall in the first clock cycle)

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for generating branch predictions for multiple branch instructions within a instruction cache line, indexed by a single instruction pointer, are described. In the following description, for purposes of explanation, numerous specific details are set forth in order to provide a thorough understanding of the present invention. It will be evident, however, to one skilled in the art that the present invention may be practiced without these specific details.

Computer System and Processor Overview

Figure 2:
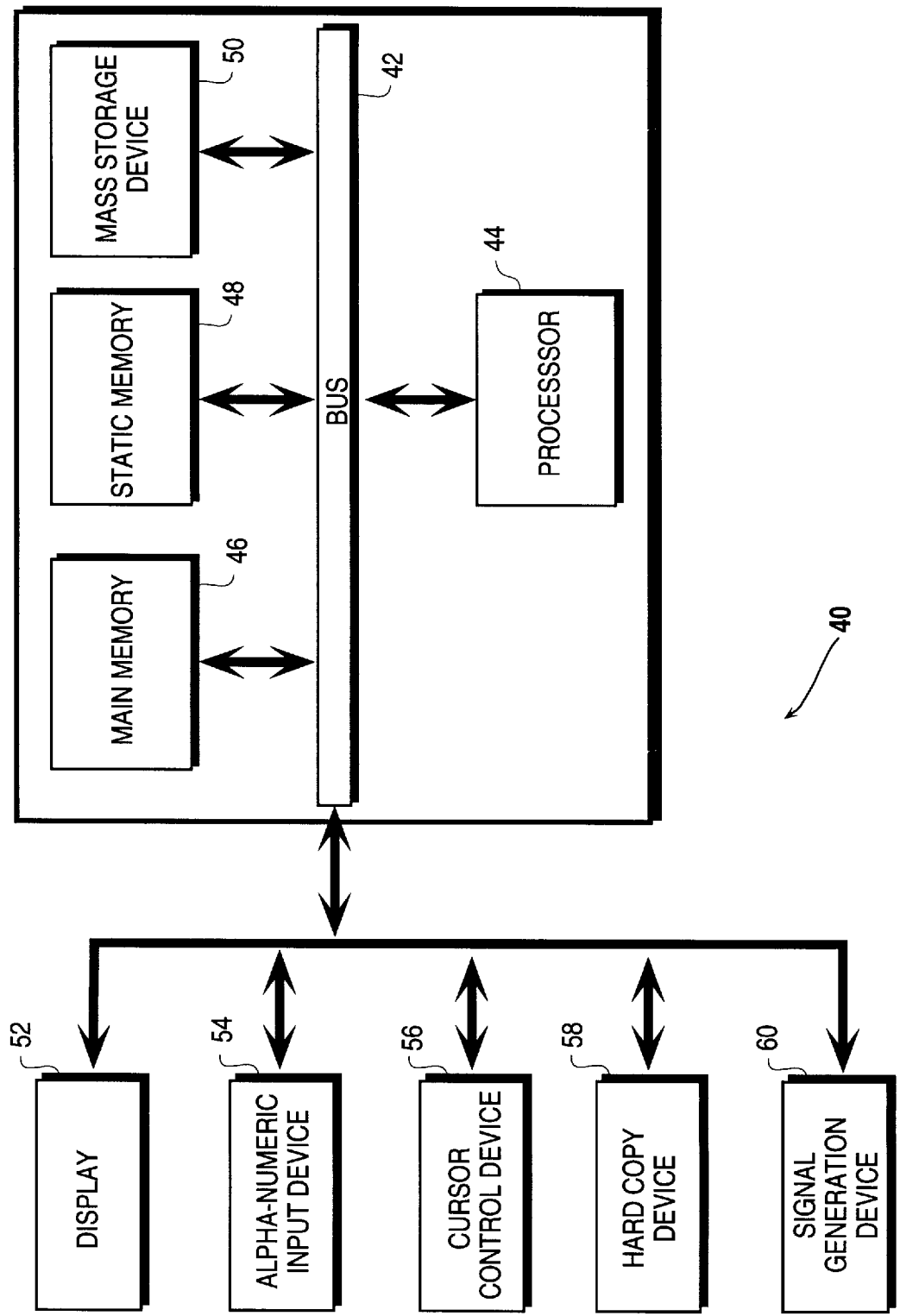
FIG. 2 is a diagrammatic representation of a computer system into which the present invention may be incorporated.

Referring to FIG. 2, an overview of a computer system 40, which may be utilized in conjunction with any one of the described embodiments of the present invention, is shown in block diagram form. It will be understood that, while FIG. 2 is useful for providing an overall description of a computer system, a number of details of the system are not shown. As necessary for disclosure of the present invention, further detail is set forth with reference to other figures provided with a specification. Further, the present invention is described with reference to exemplary embodiments. Alternative embodiments which may be conceived by one of ordinary skill in the art are considered within the scope of the invention. As illustrated in FIG. 2, the computer system 40 comprises a bus 42 for communicating information, a processor 44, coupled to the bus 42, for processing information, and a main memory 46, which is typically a random access memory (RAM), for storing information and instructions for the processor 44. The main memory 46 is also coupled to the bus 42. A static memory 48, in the form of a read only memory (ROM) or other non-volatile storage device, is coupled to bus 42, and stores non-volatile information and instructions for the processor 44. A mass storage device 50, such as a magnetic disk and associated drive unit, is also coupled to the bus 42 and stores information and instructions for use within the computer system 40. A display unit 52 (such as a cathode ray tube (CRT) or liquid crystal display (LCD)), an alpha-numeric input device 54 (such as a keyboard), a cursor control device 56 (such as a mouse or other pointing device), a hard copy device 58 (such as a printer or plotter for providing visual representations of computer images), and a signal generation device 60 (such as a microphone or loudspeaker) are all coupled to the bus 42, and are thereby coupled to each other and the other components of the computer system 40.

Figure 1:
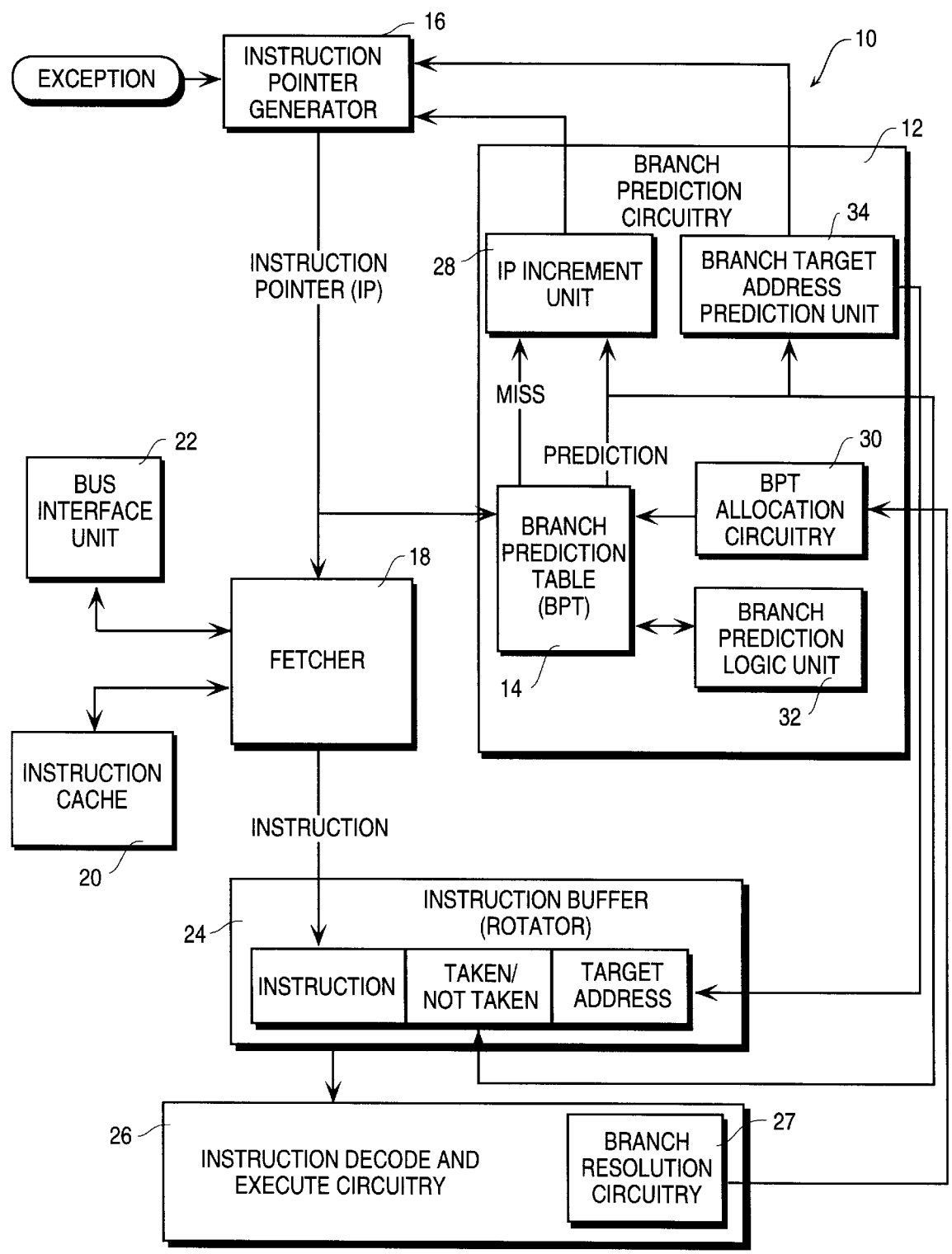
FIG. 1 is a diagrammatic representation of microprocessor circuitry including branch prediction logic.
Figure 3:
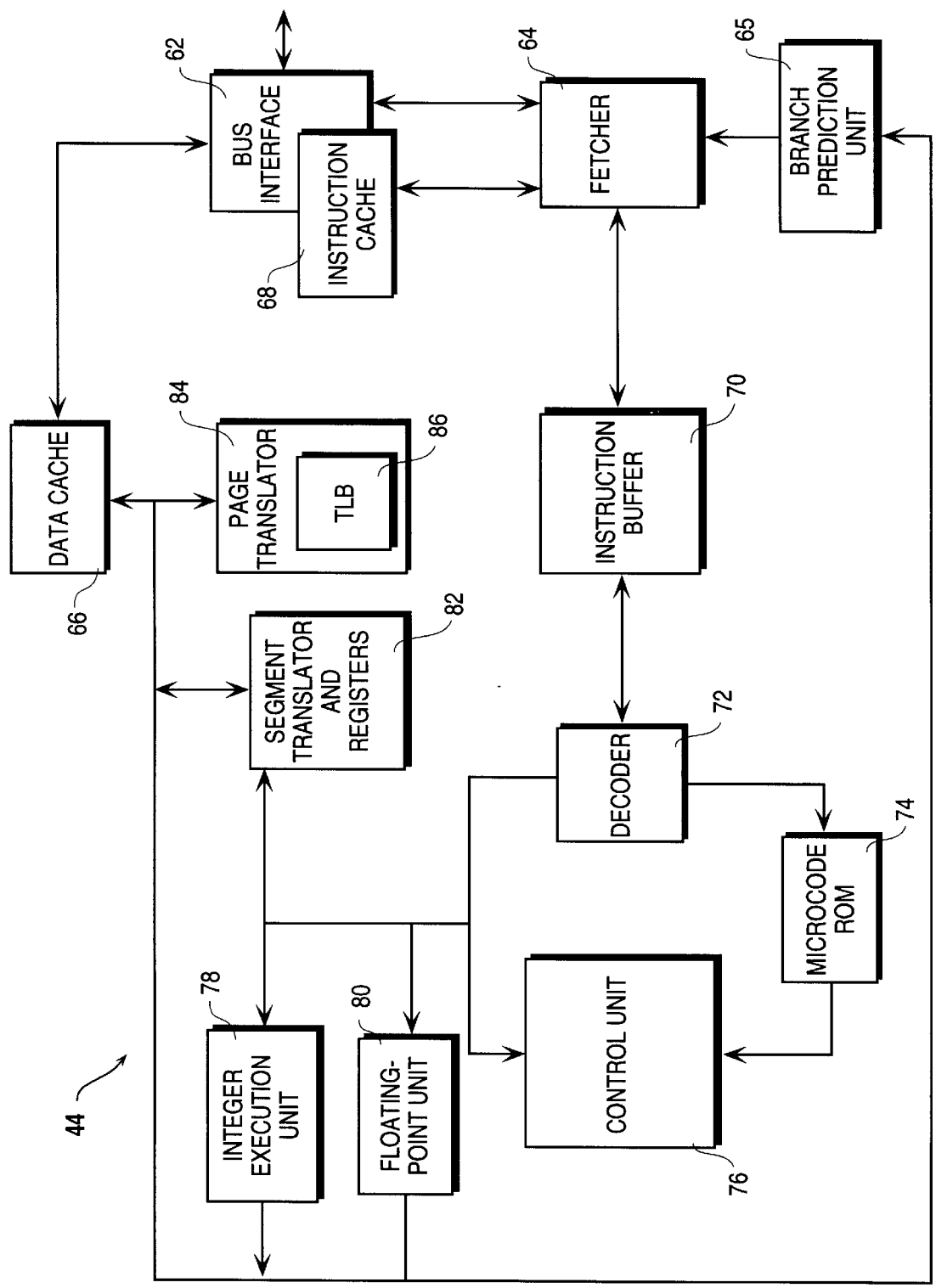
FIG. 3 is a diagrammatic representation of a microprocessor into which the present invention may be incorporated.

Referring now to FIG. 3, a more detailed overview of the processor 14 of FIG. 1 is shown in block diagram form. The processor 44 comprises a bus interface unit 62, which provides the interface between the processor 44 and the bus 32 of the computer system 40. The bus interface unit 62 is coupled to allow a fetcher 64 and a data cache 66 to access the main memory 46 of the computer system 40. Also coupled to the fetcher 64 is an instruction cache 68, also referred to in the art as a code cache. The fetcher 64 retrieves instructions indexed by an instruction pointer (which may for example be generated within a branch prediction unit 65) from the instruction cache 68 or from main memory 46 via the bus interface unit 62. The branch prediction unit 65 speculatively predicts target addresses for branch instructions retrieved by the fetcher 64, and outputs an instruction pointer dependent on the speculative branch target prediction process. The fetcher 64 propagates instructions retrieved from either the instruction cache 68, or the main memory 46, to an instruction buffer 70, from which a decoder 72 retrieves instructions, when required, for decoding. As the rate at which instructions are retrieved by the fetcher 64 is not necessarily equal to the rate at which instructions are consumed by the decoder 72, the instruction buffer 70 provides decoupling between the fetcher 64 and the decoder 72. To this end, it is convenient to regard the fetcher 64, the instruction cache 68 and the bus interface unit 62 as comprising a front end of the processor 44, which is decoupled from the back end of the processor 44, comprising the remaining circuitry described below, by the instruction buffer 70. A microcode read only memory (ROM) 74 is coupled to the decoder 72 and receives entry-points from the decoder 72. The decoder 72 and a microcode ROM 74 supply microcode instructions to a control unit 76. The control unit 76 supplies an integer pipeline execution unit 78, and a floating-point pipeline execution unit 80, with integer and floating-point instructions, respectively, for execution. The integer pipeline execution unit 78 and the floating-point pipeline execution unit 80 have access to the data cache 66 when executing the instructions. The integer pipeline execution unit 78 and the floating-point pipeline execution unit 80 are furthermore both coupled to memory management logic, which comprises a segment translator 82 and a page translator 84, the page translator 84 incorporating a translation lookaside buffer (TLB) 86. To perform the requisite functions, the integer pipeline execution unit 78 and the floating-point pipeline execution unit 80 each contain sets of address generation logic, arithmetic logic and cache memory interfaces.

The Branch Prediction Circuitry

Figure 4:
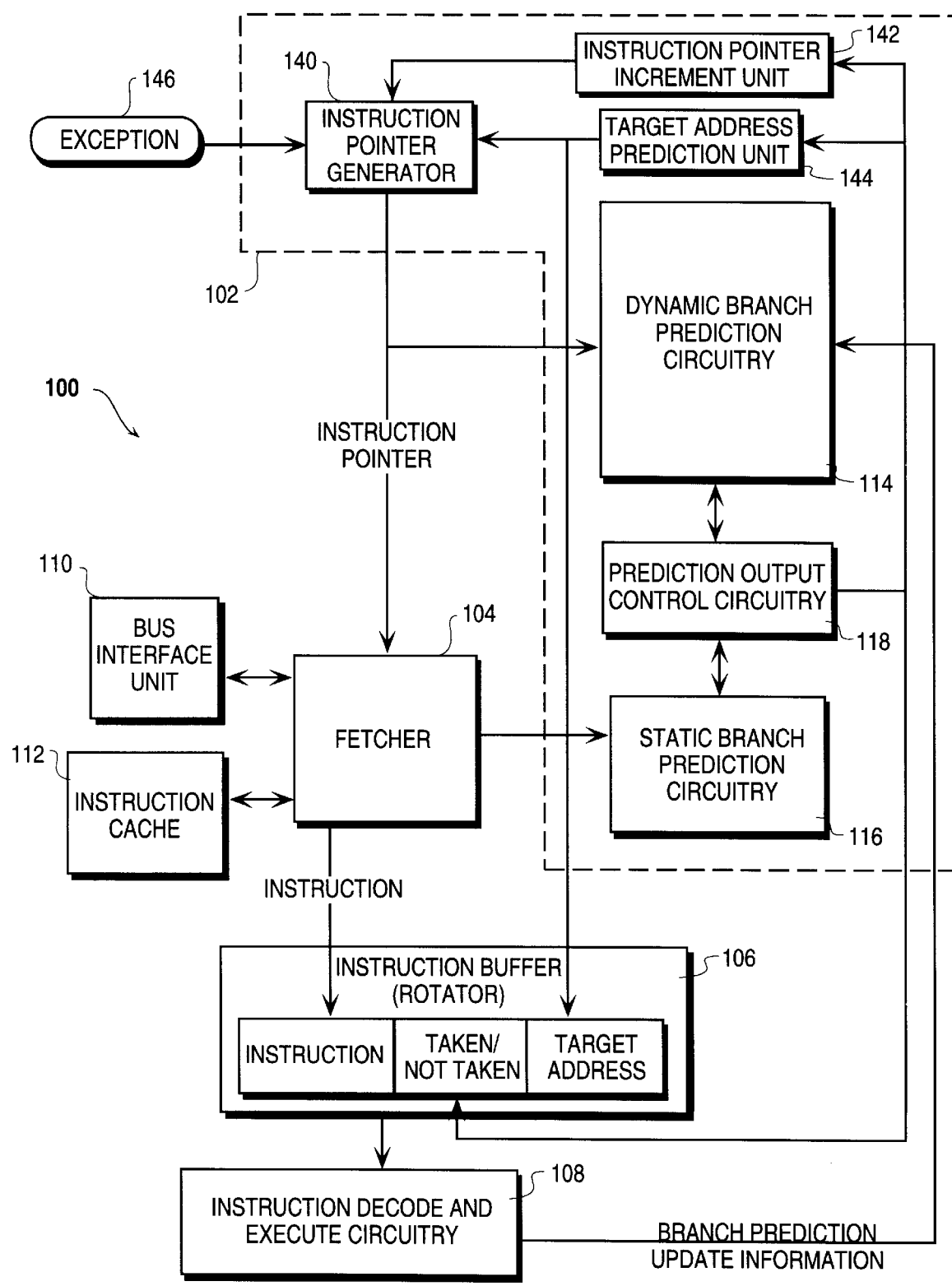
FIG. 4 is a diagrammatic representation of microprocessor circuitry including branch prediction circuitry according to the present invention.

FIG. 4 shows microprocessor circuitry, indicated generally at 100, including branch prediction circuitry 102, a fetcher 104, an instruction buffer 106 (also known in the art as a "rotator"), instruction decode and execute circuitry 108, a bus interface unit 110 and an instruction cache 116. The instruction decode and executed circuitry 108 may include a number of the microprocessor functional units described with reference to FIG. 3. The microprocessor circuitry 100 shown in FIG. 4 has a number of broad functional similarities to the microprocessor circuitry 10 shown in FIG. 1, but differs both structurally and functionally in a number of important respects. Firstly, the microprocessor circuitry 100 utilizes an instruction pointer which indexes multiple branch instructions as a group. In one embodiment, each of the multiple instructions is included within a data structure known as a "bundle", each bundle furthermore being divisible into three sub-structures termed "syllables". For the purposes of this specification, reference will merely be made to the term "instruction", with the understanding that an instruction may be incorporated within a "bundle". Furthermore, in the exemplary embodiment of the present invention described below, an instruction pointer is described as indexing a pair of instructions. However, it will readily be appreciated that the teachings of this invention can equally be applied to an architecture in which a single instruction pointer indexes any number of instructions. Referring now specifically to FIG. 4, the instruction cache 112 includes a number of cache lines, each cache line being sized to store multiple instructions. For the purposes of this specification, each instruction cache line is viewed as storing two instructions, each of which may be a branch instruction. A diagrammatic representation of an instruction cache line is provided in FIG. 7. As each instruction pointer references multiple instructions, a performance advantage is obtained within the microprocessor in that the multiple instructions referenced by the instruction pointer can simultaneously be retrieved by the fetcher 104. The fetcher 104 then dispatches instructions to the instruction buffer 106. This arrangement, whereby a single instruction pointer indexes at least two instructions for simultaneous (parallel) retrieval and serial dispatch, creates the potential for a number of difficulties with respect to branch prediction. Specifically, when two branch instructions are present within the indexed group of instructions, and a first one of these instructions is predicted as being "not taken", it is desirable to be able to perform a branch prediction for a second one of the branch instructions. It is also then desirable to output each of the two branch instructions in a serial manner, and in consecutive clock cycles, from the fetcher 104, and to synchronize the receipt of a prediction for each of the branch instructions with the receipt of a corresponding branch instruction at the instruction buffer 106. Accordingly, the order in which the branch prediction circuitry 102 outputs the respective predictions to the instruction buffer 106 must correspond to the order in which the fetcher 104 outputs the respective branch instructions to the instruction buffer 106. Furthermore, the timing with which the branch prediction circuitry 102 outputs each of the predictions must be synchronized with the timing with which the fetcher 104 outputs the respective branch instructions to the instruction buffer 106. The present invention teaches a method by which, when required, predictions for multiple branch instructions indexed as a group by a single instruction pointer, may be outputted in a correctly ordered and synchronized manner for merging with appropriate branch instructions in the instruction buffer 106.

It will be appreciated that the above described ordering and timing requirements do not arise when only one branch instruction is included within multiple branch instructions referenced by a signal instruction pointer. Further, the above problems also do not arise when, although two branch instructions are indexed by a signal instruction pointer, the branch instruction located first within the instruction stream is predicted as "taken", as this prediction will result in the instruction stream being diverted (or being resteered) and accordingly rendering the second branch instruction of no consequence.

It will also be appreciated that each group of multiple instructions indexed by a specific instruction pointer may be located within a single cache line within the instruction cache 116 or, alternatively, may be located in main memory and retrieved by the fetcher 104 via the bus interface unit 110.

The microprocessor circuitry 100, shown in FIG. 4, furthermore differs from the circuitry 10 shown in FIG. 1 in that the branch prediction circuitry 102 incorporates additional logic. Specifically, the branch prediction circuitry 102 incorporates both dynamic branch prediction circuitry 114 and static branch prediction circuitry 116. Further, the branch prediction circuitry 102 incorporates prediction output control circuitry 118, which interfaces with both the dynamic branch prediction circuitry 114 and the static branch prediction circuitry 116, and functions to control both the order and timing of predictions outputted by the prediction circuitries 116 and 114. The prediction output control circuitry 118 may control the order and timing a number of predictions received exclusively from either one of the prediction circuitries 116 and 114, or any combination or permutation of predictions received from the prediction circuitries 116 and 114. The structure and functioning of the circuitries 116-118 are described in further detailed below. The interfacing of, and control of outputs from, the dynamic branch prediction circuitry 114 and the static branch prediction circuitry 116 also give rise to a number of considerations which are addressed by the present invention.

Dynamic Branch Prediction Circuitry

Figure 5:
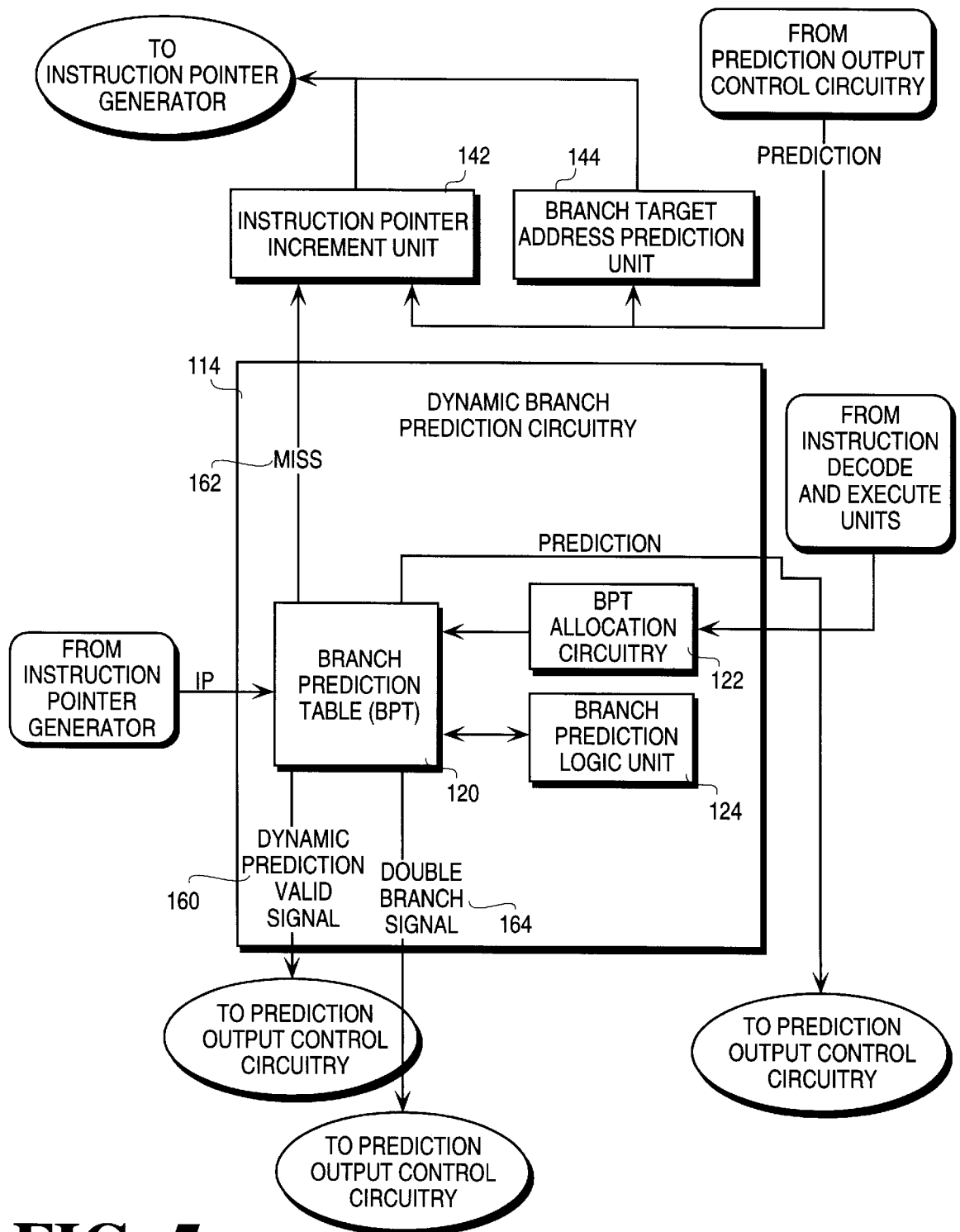
FIG. 5 is a diagrammatic representation of dynamic branch prediction circuitry comprising part of the branch prediction circuitry according to the invention and illustrated in FIG. 4.
Figure 6:
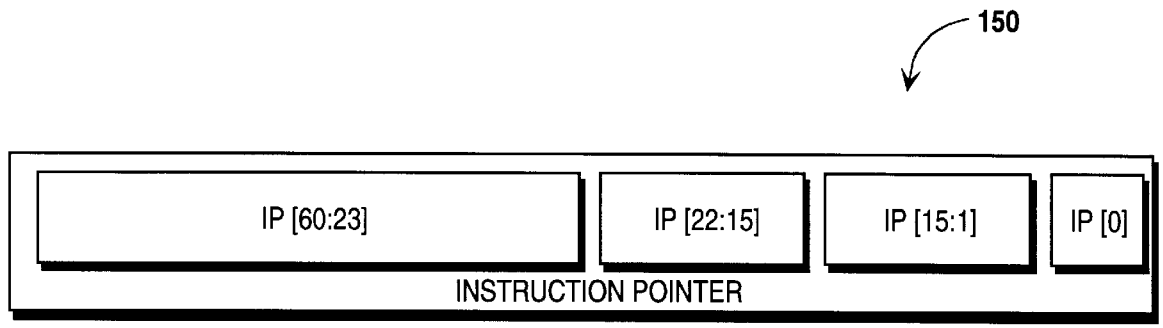
FIG. 6 is a diagrammatic representation of an instruction pointer generated by an instruction pointer generator.
Figure 8:
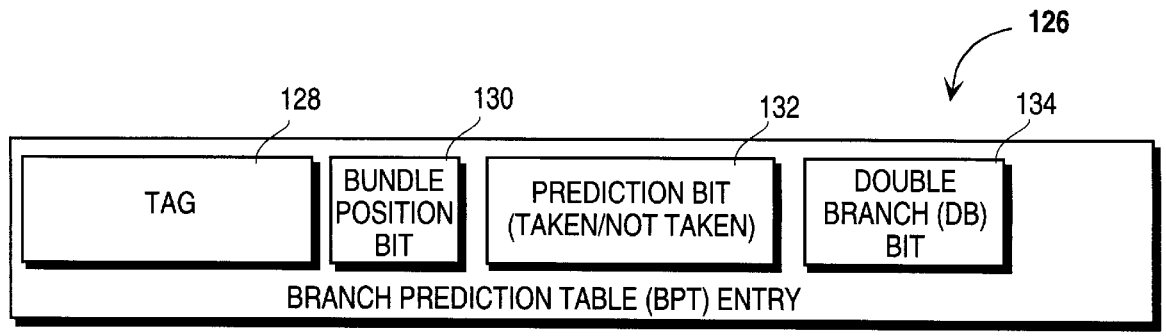
FIG. 8 is a diagrammatic representation of a branch prediction table entry of a branch prediction table.

The dynamic branch prediction circuitry 114 is so termed as it dynamically monitors and updates prediction information for branch instructions encountered in an instruction stream, based on the resolution of qualifying conditions presented by each branch instruction and on the accuracy of earlier prediction activities. A number of structures and methods for achieving dynamic branch prediction exists, and the above described exemplary embodiment is merely one example of such a structure. Referring specifically to FIGS. 4 and 5, the dynamic branch prediction circuitry 114 includes a branch prediction table (BPT) 120, branch prediction table allocation circuitry 122 and a branch prediction logic unit 124. As described above, the BPT 120 provides a cache of predictions for branch instructions most recently encountered in an instruction stream. The BPT 120 may be implemented as a four-way, set associative memory, as more fully described in co-pending U.S. patent application Ser. No. 08/785,199, entitled "Method and Apparatus for Performing Reads of Related Data from a Set-Associative Cache Memory". The BPT 120 includes a number of entries for recently encountered branch instructions. An example of a BPT entry 126 is shown in FIG. 8, the entry 126 being shown to incorporate, inter alia, a tag 128, a bundle position bit 130, a prediction bit 132, and a double branch (DB) bit 134. In an architecture in which an instruction pointer indexes two instructions (or a "bundle"), the tag 128 may correspond to bits 1–15, and the bundle position bit 130 may correspond to bit 0, of the instruction pointer value for a corresponding branch instruction. Turning again to FIG. 4, the branch prediction circuitry 102 further includes an instruction pointer generator 140, an instruction pointer increment unit 142, and a target address prediction unit 144. The instruction pointer generator 140 is coupled to received inputs from the instruction pointer increment unit 142 and the target address prediction unit 144, as well as an exception signal 146 from exception generating circuitry (not shown). Referring to FIG. 6, there is shown a representation of an instruction pointer 150 outputted from the instruction pointer generator 140. In the illustrated embodiment, instruction pointer bits 1–15 (IP[15:1]) are examined within the instruction cache 112, and a hit is generated if the instruction pointer bits 1–15 correspond to a tag within a cache line within the instruction cache 112. In a similar manner, the instruction pointer 150 is propagated to the branch prediction table 120 within the dynamic branch prediction circuitry 114, and a hit is generated, merely for example, if instruction pointer bits 0–15 correspond to the combination of the tag 128 and the bundle position bit 130 of an entry 126 within the BPT 120. On the occurrence of such a hit, the BPT 120 outputs the current state of the prediction bit 132 which indicates the respective branch as being "taken" or "not taken". The state of the prediction bit 132 is propagated to the prediction output control circuitry 118 which, within the appropriate clock cycle and in an appropriate order, forwards this prediction to the instruction pointer increment unit 142, the branch target address prediction unit 144 and the instruction buffer 108. Should the relevant branch be predicted as being "not taken", the instruction pointer increment unit 142 will increment the instruction pointer by an appropriate value, such as 2 in the present example. Alternatively, should the relevant branch be predicted as "taken", target address prediction unit 144 generates a branch target address. The target address prediction unit 144 generates this branch target address utilizing either target address information incorporated within the relevant instruction, or by accessing a table (not shown) which provides a history of branch addresses previously targeted by the relevant instruction.

On the occurrence of a hit within the BPT 120, a dynamic prediction valid signal 160 is also propagated to the prediction output control circuitry 118, to indicate to the circuitry 118 that a valid dynamic branch prediction has occurred.

In the event that there is no hit within the BPT 120 for a specific instruction pointer, the BPT 120 outputs a MISS signal 162 directly to the instruction pointer increment unit 142, which then increments the relevant instruction pointer by a predetermined value, and forwards this incremented instruction pointer to the instruction pointer generator 140.

As described with reference to FIG. 1, the BPT allocation circuitry 122 is responsible for allocating entries 126 within the BPT 120, and the branch prediction logic unit 124 is responsible for setting the prediction bit 132 within each entry 126 to either zero (0) or one (1) to indicate the branch as being either "taken" or "not taken" in accordance with a prediction algorithm employed by the branch prediction logic unit 124. The instruction pointer generator 140 issues an instruction pointer that, in the absence of a "taken" branch instruction, is incremented to refer to the next instruction cache line and, as each instruction cache line stores two instructions, is advanced by 2 each such iteration. Accordingly, the fetcher 104 is not concerned with the value of the instruction pointer bit 0 (IP[0]), as the retrieval of the instructions by the fetcher 104 occurs at a resolution lower than the highest resolution provided by the instruction pointer 150. For example, to register a hit in the instruction cache 112, the only condition is that instruction pointer bits 1–15 (IP[15:1]) correspond to the tag of an instruction cache line. If so, then the entire contents of the instruction cache line, which includes instructions at two consecutive instruction pointer values (for which IP [0]=0 and 1 respectively), is retrived by the fetcher 104. As the fetcher 104 retrieves instructions at a lower resolution than the resolution with which instructions are referenced in the BPT 120, it is conceivable that, when advancing the instruction pointer by two as described above, a branch instruction may be retrieved for which there is an entry in the BPT 120, but for which no hit in the BPT 120 occurs. Consider the example of two consecutive branch instructions referenced by instruction pointer values IP and IP+1. Assuming that the instruction pointer is incremented by two to reference a subsequent instruction cache line, only instruction pointer values IP and IP+2 will be presented to the BPT 120, and consequently a BPT entry for the branch instruction reference by IP+1 may be missed. To prevent this situation from occurring, an entry 126 within the BPT 120 is provided with the double branch (DB) bit 134, which may be set to indicate that another instruction within the group of multiple instructions indexed by the instruction pointer is also a branch instruction. Thus, continuing the above example, for an instruction pointer value IP, a hit within the BPT 120 for this value may reveal that another instruction within the indexed cache line (i.e. the instruction at IP+1) is a branch instruction. Accordingly, the BPT 120 is furthermore able to output a double branch signal 164 to the prediction output control circuitry 118, as shown in FIG. 5. When the double bit (DB) of an entry within the BPT 120 is set, and an intially encountered branch instruction is predicted as "not taken", a recycle stall occurs in which the instruction pointer is not advanced, so as to allow the BPT 120 to be reaccessed to determined whether there are BPT entries for any further branch instructions within the cache line.

Finally, the dynamic branch prediction circuitry is configured to output predictions for two or more branch instructions, indexed as a group for retrieval, to the output control circuitry either in consecutive clock cycles using a re-access mechanism, as described in co-pending U.S. patent application Ser. No. 08/576,954, entitled "Branch Prediction Table Having Pointers Identifying Other Branches within Common Instruction Cache Lines", filed Dec. 27, 1995, or simultaneously, as described in co-pending U.S. patent application Ser. No. 08/785,199, entitled "Method and Apparatus for Performing Reads of Related Data from a Set-Associative Cache Memory".

The Static Branch Prediction Circuitry

The static branch prediction circuitry 116, in contrast to the dynamic prediction circuitry 114, does not actively maintain a record of the history for a specific branch instruction. In one embodiment, the static branch prediction circuitry 116 relies on information encoded into a branch instruction by a compiler (not shown) at compilation of the relevant branch instruction. The compiler may set a prediction bit, within the branch instruction, to indicate the branch instruction as being either "taken" or "not taken" after examining a number of factors and attributes relating to the branch instruction. The accuracy of static branch predictions are usually inferior to dynamic branch predictions generated by the dynamic branch prediction circuitry 114. The static branch prediction circuitry 116 is coupled to the fetcher 104, from which it retrieves and then utilizes the branch prediction information for branch instructions provided by the compiler. Having performed a static branch prediction, the circuitry 116 is coupled to propagate a prediction 180 to the prediction output control circuitry 118.

The static prediction circuitry 116 also examines a branch instruction retrieved by the fetcher 104 to determine whether the relevant branch instruction includes a double branch indicator indicating that a further instruction, within the group of multiple instructions is indexed by the instruction pointer, is a branch instruction. Should the relevant branch instruction include a double branch indicator, the static branch prediction circuitry 116 outputs a double branch signal 182 to the prediction output control circuitry 118.

The Prediction Output Control Circuitry

Figure 9:
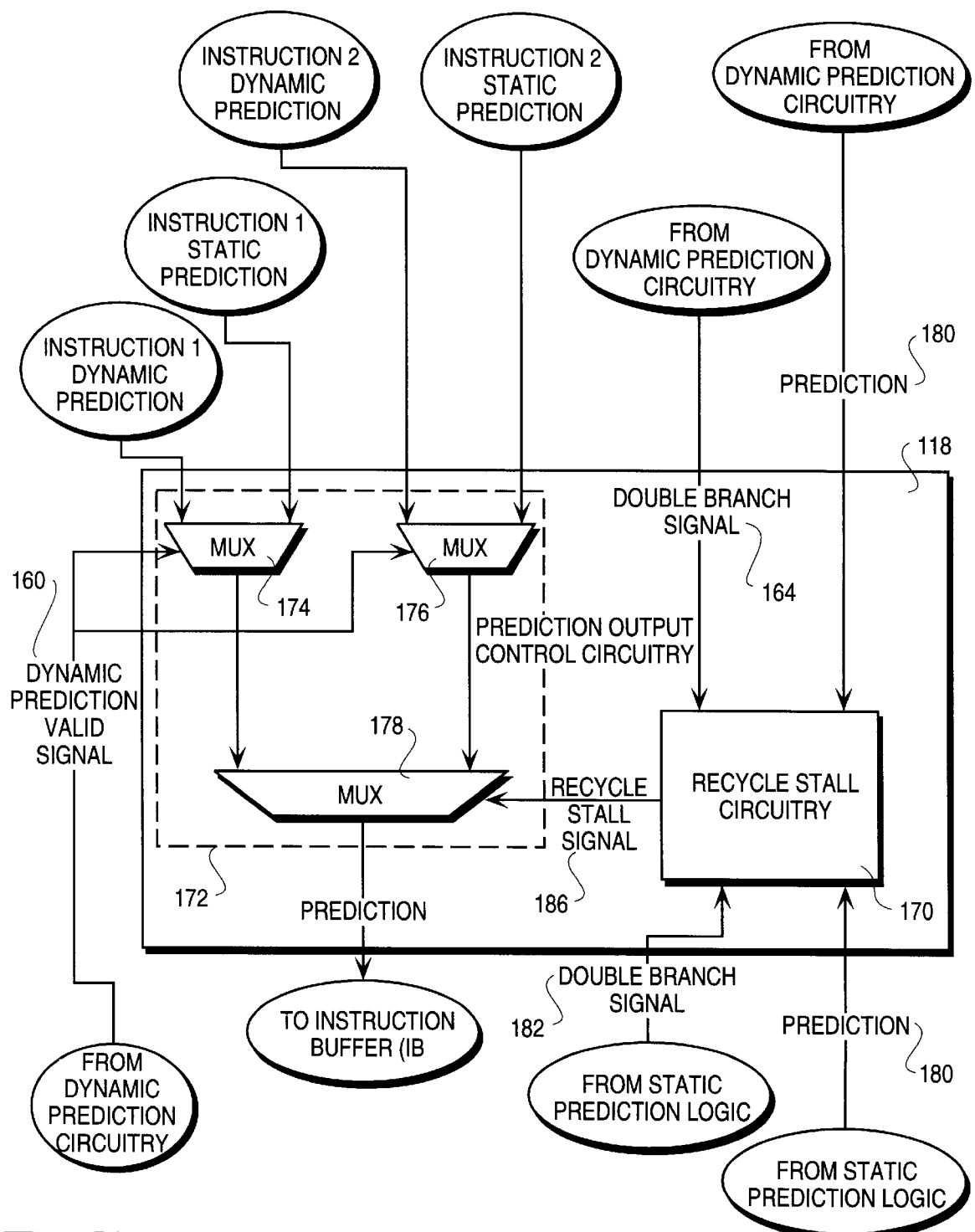
FIG. 9 is a diagrammatic representation of prediction output control circuitry comprising part of the branch prediction circuitry according to the invention and illustrated in FIG. 4.

Referring to FIGS. 4 and 9, the prediction output control circuitry 118 includes recycle stall circuitry 170 and prediction selection circuitry 172. The prediction selection circuitry 172 in turn comprises multiplexers (MUXs) 174, 176 and 178. Broadly, the recycle stall circuitry 170 is responsible for the timing of the output of a prediction from the prediction selection circuitry 172, while the prediction selection circuitry 172 is responsible for the selection of an appropriate prediction from among the various predictions that may be received from the dynamic and static branch prediction circuitries 114 and 116. The need for the recycle stall circuitry 170 (also termed "reaccess circuitry") arises out of the capability of each instruction cache line within the instruction cache 112 to store more than one "bundle" of instructions. As each instruction cache line is indexed as a unit by an instruction pointer for retrieval by the fetcher 104, it may occur that the relevant instruction cache line includes two or more branch instructions. From a branch prediction viewpoint, assuming a sequentially first branch instruction is predicted as being "not taken" or misses the BPT, it is desirable to determine whether there are entries in the BPT for any of the other branch instructions. For this reason, a "recycle" or "reaccess" stall may be performed so as to allow the BPT to be indexed for the other branch instructions. The recycle stall circuitry 170 thus facilitates this process, and is also responsible for the timing of the output of predictions for two or more branch instructions indexed by a single instruction pointer.

The recycle stall circuitry 170 is coupled to receive double branch signals 164 and 182 from the dynamic and static branch prediction circuitries 114 and 116 respectively. The recycle stall circuitry 170 is also coupled to receive predictions 180, identifying a relevant branch instruction as being either "taken" or "not taken", for branch instructions indicating the existence of a double branch, from both the dynamic and static prediction circuitries 114 and 116. In the event that a branch instruction for a first branch instruction, processed by either the prediction circuitries 114 or 116, indicates the existence of a double branch (i.e. the existence of a second branch instruction in the group of indexed instructions), and the first branch instruction is predicted as being "not taken", then the recycle stall circuitry 170 asserts a recycle stall signal 186, indicating that the instruction pointer is to be stalled, so as to allow for a prediction to be outputted for the second branch instruction. In other words, the recycle stall circuitry 170 only asserts the recycle stall signal 186 on the occurrence of at least two branch instructions within a group of multiple instructions indexed by a single instruction pointer, and when a first branch instruction of the group is "not taken". The recycle stall signal 186 is not asserted when only one branch instruction is present in the indexed group as there is no need to attempt to obtain a dynamic or static branch prediction for any further branch instructions, nor to order the output of multiple predictions in this case. The recycle stall signal 186 is also not asserted when the first instruction is predicted to be "taken", and this prediction will result in a redirection of the instruction stream, and any subsequent branch instructions within the indexed group are of no concern, and will not be speculatively processed.

The MUXs 174 and 176 are each operable by the dynamic prediction valid signal 160, received from the dynamic prediction circuitry 114, to selected one of two inputs for output to the MUX 178. Again assuming a situation in which at least two branch instructions, namely first and second branch instructions, are encountered within an instruction group indexed by the instruction pointer, the MUX 174 is coupled to receive any predictions for the first branch generated by the either the dynamic or static branch prediction circuitries 114 or 116. Similarly, the MUX 176 is coupled to receive any predictions for the second branch instruction which are generated by either the dynamic or static branch prediction circuitries 114 or 116. As long as the dynamic prediction signal 160 is asserted, the MUXs 174 and 176 will output only predictions received from the dynamic branch prediction circuitry 114, whereas if the dynamic prediction valid signal 160 is not asserted, the MUXs 174 and 176 will output predictions received from the static branch prediction circuitry 116. The MUX 178 is coupled to receive the outputs of the MUXs 174 and 176 as inputs, and is operable by the recycle stall signal 186 to select either of its inputs as an output to the instruction buffer 106. If the recycle stall signal 186 is asserted, the MUX 178 outputs a prediction for the second branch instruction, whereas a prediction for the first branch instruction will be outputted if the recycle stall signal 186 is not asserted.

Methodology for Generating Branch Predictions

Figure 7:
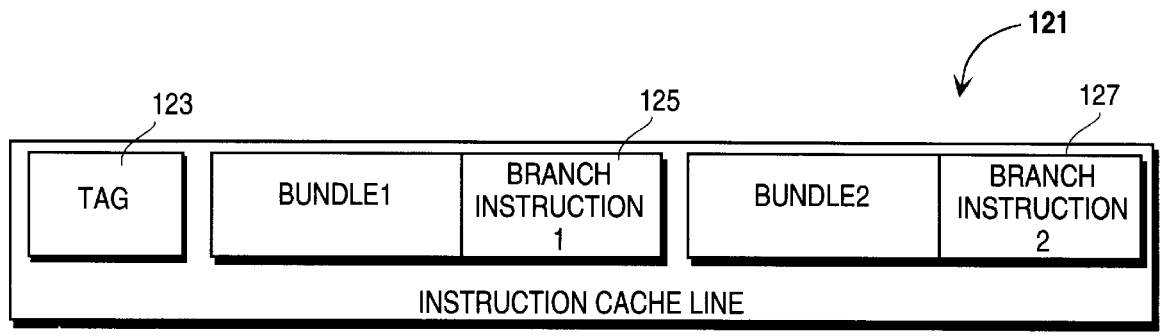
FIG. 7 is a diagrammatic representation on an instruction cache line within an instruction cache.

The functioning of the above described computer system, microprocessor and circuitries will now be described with reference to the flowcharts shown in FIGS. 10A–10E, which detail an exemplary method 200 of generating branch predictions for multiple branch instructions indexed by a single instruction pointer for the purposes of retrieval by the fetcher 104. Assume for the purpose of explanation that the instruction pointer generator 140 outputs an instruction pointer for which there is a hit with reference to the instruction cache line 121, as shown in FIG. 7, of instruction cache 112. As illustrated, instruction cache line 121 includes a tag which is compared to bits 1–15 (IP[15:1]) of the instruction pointer to determine whether a hit occurs with reference to the instruction cache line 121. The instruction cache line 121 further includes two instructions, namely first and second instructions 125 and 127, either or both of which may be branch instructions. Each of the instructions 125 and 127 may or may not have corresponding entries in the BPT 120.

As a first step in the exemplary method 200, a determination is made at step 202 as to whether bit 0 (IP[0]) of the instruction pointer output is 0. If not (i.e. IP[0]=1), this indicates that the instruction pointer is indexing the second instruction 127 within the instruction cache line 121. This situation could occur as a result of a jump from another branch instruction, and typically would not arise where the instruction pointer is being advanced sequentially through instructions of a computer program. It will also be appreciated that the instruction pointer could similarly index a grouping of three or more instructions stored within an instruction cache line 121 of the instruction cache 112 or in main memory 16. In the present example, if the instruction pointer is indexing the second instruction 127 within the instruction cache line 121, the contents of this entire instruction line will be retrieved by the fetcher 104, which then dispatches only the second instruction to the instruction decode and execute circuitry 108, ignoring all preceding instructions. For the exemplary embodiment, clearly there are no subsequent branch instructions, in the indexed instruction cache line 121, for which predictions may be lost. Accordingly, the method 200 then teaches advancing the instruction pointer by one (1) at step 204. Assuming that the second instruction 127 was not a branch instruction predicted as being "taken", the instruction pointer will then index the instruction cache line following the cache line 121 in the instruction cache 112, and any entry in the BPT 120 for the first instruction stored in that cache line.

For the purposes of explaining the full functioning of the above described embodiment of the invention, it is further necessary to assume that the first and second instructions 125 and 127 are both branch instructions, and further that the first branch instruction 125 is predicted as being "not taken". As detailed above, should the first instruction be predicted as being "taken", no prediction need be generated for the second branch instruction, as the instruction pointer will then jump to a branch target address.

The above assumptions having been made, four scenarios can now arise with respect to the branch prediction circuitry 102, namely:

1. static predictions are generated for both the first and second instructions 125 and 127 by the static prediction circuitry 116, if no entries exist for either of these instructions in the BPT 120 (or other structures) of the dynamic prediction circuitry 114;
2. a dynamic prediction is generated for the first instruction 125 as a result of a corresponding entry in the BPT 120 (or other dynamic prediction structure), and a static prediction is generated for the second instruction 127 as a result of the absence of a corresponding entry in any dynamic prediction structures;
3. a dynamic prediction is generated for the second instruction 127 as a result of a corresponding entry in the BPT 120 (or other dynamic prediction structure), and a static prediction is generated for the first instruction 125 as a result of the absence of a corresponding entry in any dynamic prediction structures; or
4. dynamic predictions are generated for both the first and second instructions 125 and 127 as a result of entries for these instructions within the dynamic prediction structures, such as the BPT 120, of the dynamic prediction circuitry 114.

Each of the above scenarios will be discussed with reference to FIGS. 5–10D. Further each of the steps described below is stated to be performed in one of three clock cycles, namely clock cycles 0–2. It will be appreciated that there is a need for "arbitration" between the dynamic and static prediction circuitries in view of the fact that it is more desirable that a dynamic prediction be generated for a branch instructions as:

1. a dynamic prediction is, as described below, capable of being generated one clock cycle prior to the generation of a static prediction for a branch instruction. This is because the static prediction information is embedded in the relevant branch instruction, and is only available once the branch instruction has been retrieved by the fetcher.
2. a dynamic prediction is more accurate than a static prediction for a branch instruction.

Accordingly, when a dynamic prediction is generated for a branch instruction, this should be communicated to the static prediction circuitry so that a static prediction is not generated. Similarly, when a dynamic prediction cannot be performed, the static prediction circuitry must be notified.

First and Second Branch Instructions Statically Predicted

If IP[0]=0 at step 202, a determination is made at step 206, and in clock cycle 0, as to whether there is a hit in the BPT 120 (or any other dynamic prediction structures) for the first instruction 125. If not, the dynamic prediction valid signal 160 is not asserted, thus causing MUXs 174 and 176 of the prediction selection circuitry 172 to select an input from the static prediction circuitry 116 as an output to the MUX 178. The method 200 then proceeds to step 208, as illustrated at in FIG. 10B, where a determination is made, again in clock cycle 0, as to whether there is a hit in the BPT 120 (or any other dynamic prediction structures) for the second instruction 127. If not, the method 200 proceeds to step 210 at which a static prediction is generated for the first instruction 125 by the static prediction circuitry 116, in a clock cycle 1. At step 212, the recycle stall signal 170 is asserted by the recycle stall circuitry 17 during clock cycle 1, after receiving an indication from the static branch prediction circuitry 116, via double branch signal 182 and prediction signal 180, that a double branch is present and that the first branch instruction 125 was "not taken". In response to the assertion of the recycle stall signal 186, the MUX 178 outputs the static prediction for the first instruction 125 to the instruction buffer 106 in clock cycle 1, at step 214. If the prediction for the first instruction is "not taken", a static prediction is generated for the second instruction 127, in clock cycle 2, as shown at step 216 in FIG. 10C. This prediction is then propagated to MUX 176 of the prediction output control circuitry 118. Again, as no dynamic prediction occurred, the dynamic prediction valid signal 160 remain de-asserted, causing MUX 176 to output the static branch prediction to MUX 178. At step 218, the recycle stall signal 186 is de-asserted, thereby causing MUX 178 to output the static prediction for the second instruction 127 to the instruction buffer 106, during clock cycle 2, at step 218. At step 220, if the prediction for the second instruction 127 was that it was "taken", then the method is diverted to step 222, at which a branch target address is generated by the target address prediction unit 144. The target address prediction unit 144 may utilize branch target address information contained within the second instruction 127 to generate a branch target address prediction for this instruction. Alternatively, should it be determined at step 2220 that the prediction for the second instruction 127 is that of "not taken", the instruction pointer is simply incremented by two at step 224.

Accordingly, the method 200 provides static predictions for both the instructions 125 and 127 serially, in order, and in consecutive clock cycles 1 and 2, to the instruction buffer 106. In order for the predictions received from the prediction output control circuitry 118 to be properly associated with the first and second instructions within the instruction buffer 106, the fetcher 104 also outputs the first and second instructions to the instruction buffer 106 in clock cycles 1 and 2 respectively.

First Instruction Dynamically Predicted, Second Instruction Statically Predicted In this scenario, in response to the determination made at step 206, the method 200 will proceed to step 226, at which the recycle stall signal 186 is asserted by the recycle stall circuitry 170 by default. The recycle stall signal 186 is asserted as a result of the assertion of the double branch signal 164 by the dynamic branch circuitry 114, in view of the double branch (DB) bit 134 in the entry for the first instruction 127 in the BPT 120 being set. At step 228, the dynamic prediction valid signal 160 is asserted, during clock cycle 1, causing the MUX 174 to output any dynamic prediction for the first instruction 125 to the MUX 178. The dynamic prediction valid signal 160 may also be propagated directly to the static branch prediction circuitry 116, and used to disable the circuitry 116 and to thus prevent the circuitry 116 from performing a static prediction for the first instruction 125.

At step 230, the dynamic prediction for the first instruction 125 is performed during clock cycle 1, channeled via the MUX 174 to the MUX 178, and outputted from the MUX 178 to the instruction buffer 106, at step 232 and during clock cycle 1, as a result of the recycle stall signal 186 being asserted. At step 234, a determination is made as to whether the first instruction 125 was predicted as being "taken". If so, the method 200 proceeds to step 236, where a branch target address is generated by target address prediction unit 144, either by accessing tables associated with the unit 144 or utilizing target address information encoded within the first instruction 125.

If the first instruction 125 is predicted as being "not taken", the method 200 proceeds to step 238, where a determination is made as to whether a hit occurs in the BPT 120 (or any other dynamic prediction structures) for the second instruction 127. In the present scenario, no hit will be registered, and the method 200 will proceed to perform the steps 216–220, as described above with reference to FIG. 10C.

Figure 10A:
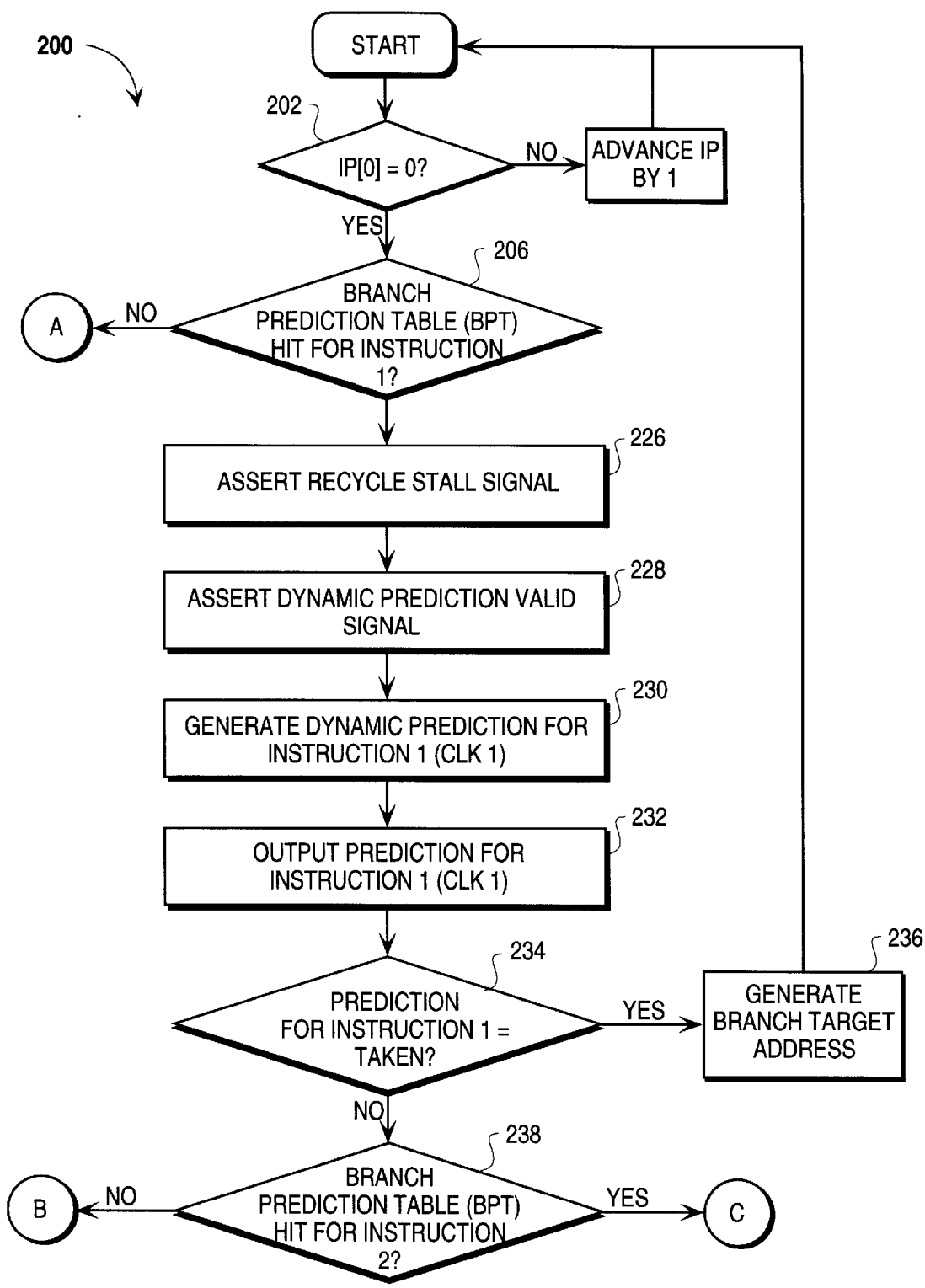
FIGS. 10A–10D are flowcharts illustrating a method of generating branch predictions for multiple branch instructions indexed, as a group, by a single instruction pointer.
Figure 10B:
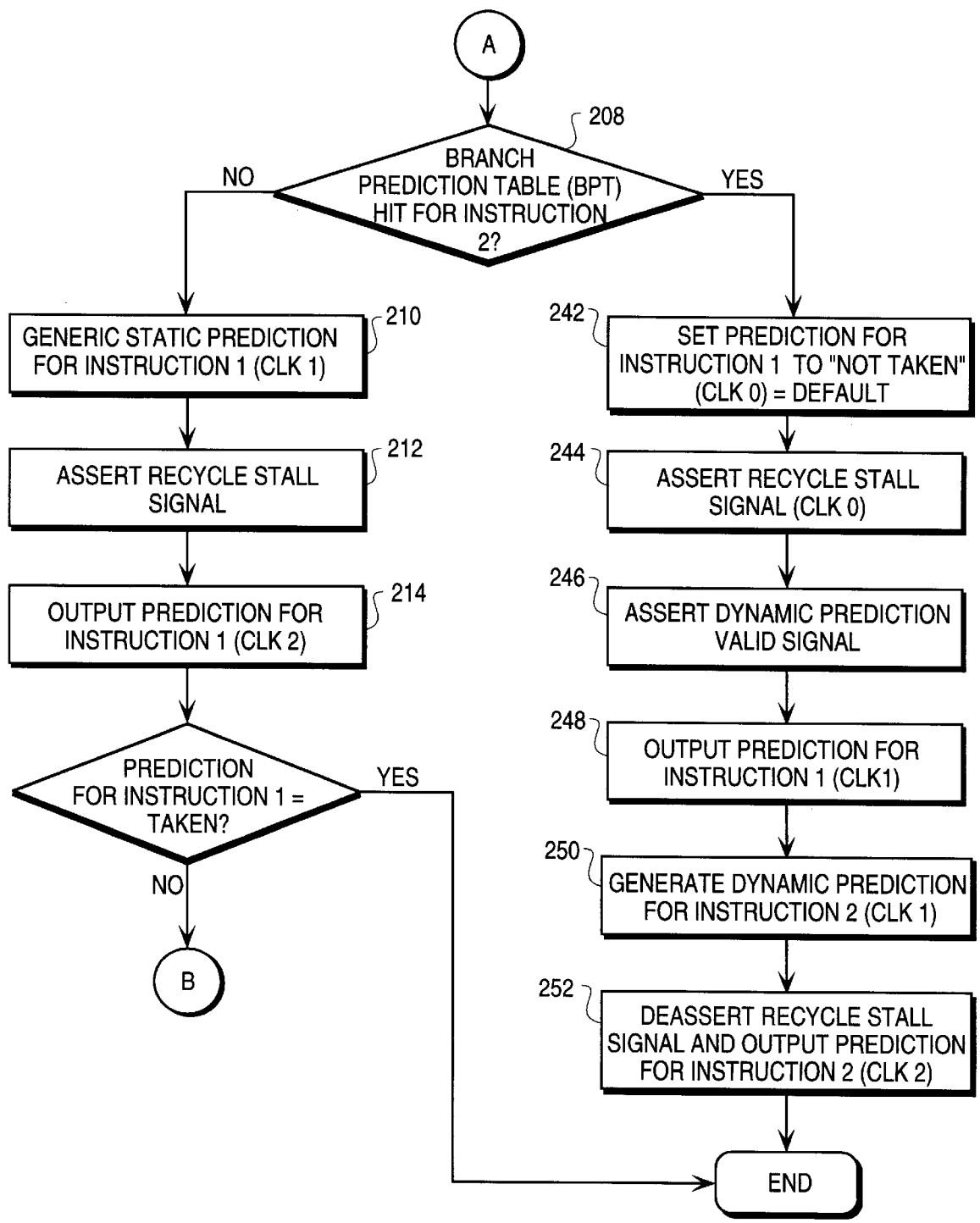
Figure 10C:
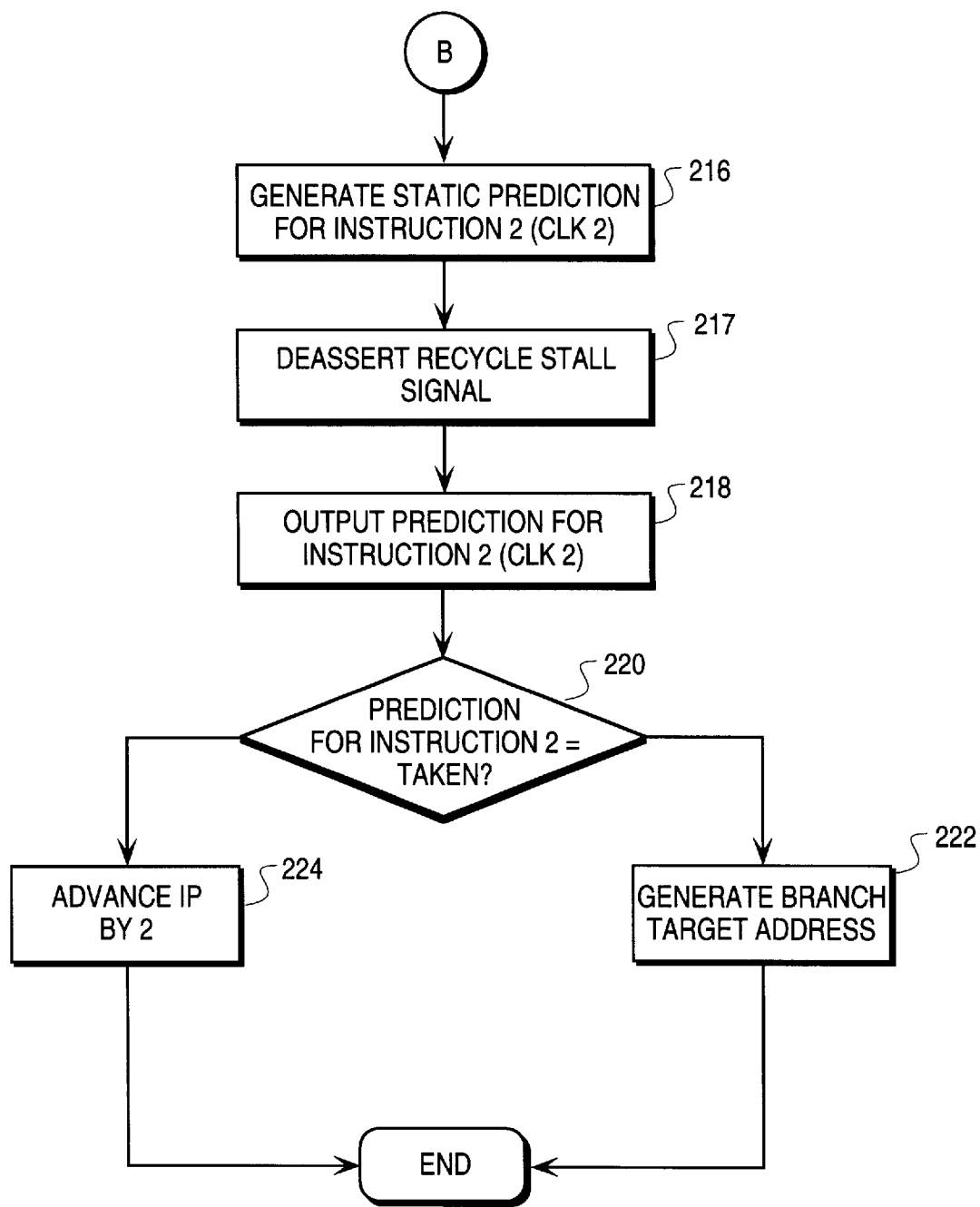

First Instruction Statically Predicted, Second Instruction Dynamically Predicted In this scenario, a determination is made at step 206 that there is no hit within the BPT 120 for the first instruction 125, and the method accordingly proceeds to step 208, as shown in FIG. 10B. The recycle stall signal 186 and the dynamic prediction valid signal 160 are not asserted at this time, in view of there being no hit within the BPT 120. At step 208 and during clock cycle 0, a determination is made as to whether there is a hit within the BPT 120 for the second instruction 127. In the present scenario, a hit will be registered and, at step 242, a "quasi-dynamic" prediction of "not taken" is generated for the first instruction 125 by default, as for an entry to have been allocated for the second instruction 127 within the BPT 120, the corresponding cache line must have been visited before, and the first instruction 125 predicted as being "not taken" (as only "taken" branch instruction are allocated entries within the BPT 120). At the following step 244, the recycle stall signal 186 is asserted by the recycle stall circuitry 170 and, at step 246, the dynamic prediction valid signal 160 is asserted. The "quasi-dynamic" prediction for the first instruction 125 is then outputted during clock cycle 1, at step 248, as a result of the signals 186 and 160 being asserted as described above. At step 250, a dynamic prediction is generated for the second instruction 127 during clock cycle 1, whereafter the recycle stall signal 186 is de-asserted in clock cycle 2, causing the dynamic prediction for the second instruction 127 to be outputted to the instruction buffer 106, at step 252.

Accordingly it will be appreciated that, while no dynamic prediction could be performed for the first instruction 125 as a result of a hit within the BPT 120, a "quasi-dynamic" prediction is nonetheless generated, and the dynamic prediction valid signal 160 is asserted over both the clock cycles 1 and 2, thus preventing the prediction output control circuitry 118 from outputting a static prediction and/or preventing the static prediction circuitry 116 from performing a static prediction for either of the instructions 125 or 127.

Alternatively, it is possible to merely have a prediction for the first branch instruction generated by the static prediction circuitry, and to then perform a dynamic prediction for the second instruction in a conventional manner. The methodology discussed above, however, is an optimization which provides a performance advantage.

First and Second Branch Instructions Dynamically Predicted

Figure 10D:
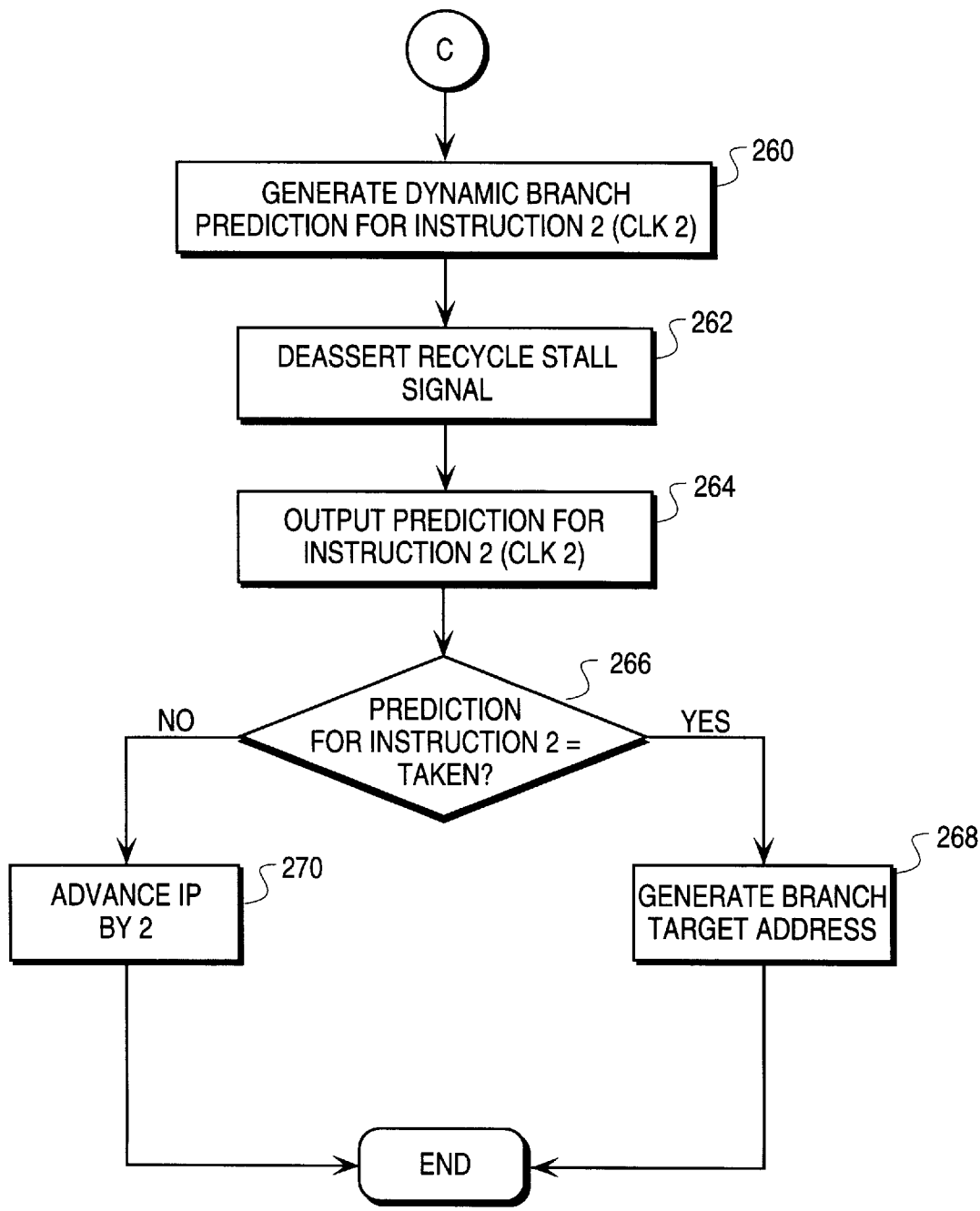

In this scenario, a determination is made at step 206 that a hit occurs within the BPT 120 (or any other dynamic prediction structure) for the first instruction 125, and the method then proceeds through steps 226–238, as described above. At step 238, it is determined that there is a hit for the second branch instruction 127 in the BPT 120 (or any other dynamic prediction structure), and the method 200 accordingly proceeds to step 260, where a dynamic prediction for the second instruction 127 is then generated as shown in FIG. 10D. At step 262, and during clock cycle 2, the recycle stall signal is deasserted. The prediction for the second instruction 127 outputted from the MUX 178 at step 264 as a result of a recycle stall having occurred in the preceding clock cycle. In one exemplary embodiment, the occurrence of a recycle stall in the preceding clock cycle may be detected by a transition of the recycle stall signal (i.e. by the deassertion of the recycle stall signal). However, any other means by which a recycle stall in a preceding clock cycle may be detected can also be employed to trigger the output of the prediction for the second instruction 127. At step 266, a determination is made as to whether the second instruction 127 was predicted as being "taken" or "not taken". If instruction 127 was predicted as being "taken", a branch target address is generated at step 268 by the target address prediction unit 144, by accessing history records maintain by the unit 144 or utilizing branch target information included within the second instruction 127 itself. Alternatively, should instruction 127 be predicted as being "not taken", the instruction pointer is incremented by 2 by the instruction pointer increment unit 142 at step 270.

In conclusion, the above described invention is advantageous in that it facilitates the output of predictions for multiple branch instructions, indexed as a group by an instruction pointer, in a serial manner and in the order in which the relevant branch instructions appear in the instruction stream. This is desirable as it allows branch instructions, which are issued serially from the fetcher 104, and corresponding predictions, to be received together at the instruction buffer 106. The serialization of the output of predictions is furthermore desirable in that the bus required for the propagation of prediction information, for example from the branch prediction circuitry 102 to the instruction buffer 106, need only be wide enough to accommodate prediction information for a single branch instruction. Accordingly, die space dedicated to such a bus is minimized.

Thus, a method and apparatus for generating branch predictions for multiple branch instructions, indexed by a single instruction pointer, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method of generating respective branch predictions, in a microprocessor, for first and second branch instructions, both of which are indexed by a first instruction pointer, the method comprising the steps of:

generating a first branch prediction for the first branch instruction; and if the first branch is predicted as being not taken, then:
initiating a recycle stall during which the first instruction pointer is stalled;
propagating the first branch prediction to an instruction buffer;
generating a second branch prediction for the second branch instruction; and
propagating the second branch prediction to the instruction buffer.

2. The method of claim 1 including the step of toggling a recycle stall signal in response to the initiation of the recycle stall.

3. The method of claim 1 wherein the first and second branch predictions are respectively propagated to the instruction buffer in successive clock cycles.

4. The method of claim 1 wherein the generation of the first branch prediction and the initiation of the recycle stall occur in a first clock cycle.

5. The method of claim 4 wherein the recycle stall is terminated and the generation of the second branch prediction occur in the second clock cycle.

6. The method of claim 1 wherein both the first and second branch predictions are static branch predictions not based on previous branch resolution activity, and the generation of the second branch prediction and the propagation of the second branch prediction to the instruction buffer occur in the same clock cycle.

7. The method of claim 1 wherein the first branch prediction is a dynamic branch prediction based on the outcome of previous branch resolution activity within the microprocessor, and the method includes the step of toggling a dynamic prediction valid signal in response to the generation of the first branch prediction.

8. The method of claim 1 wherein the microprocessor includes dynamic branch prediction circuitry configured to generate a dynamic branch prediction based on the outcome of previous branch resolution activity, and static branch prediction circuitry configured to generate a static branch prediction based on static branch prediction information, the method including the step of preventing the static branch prediction circuitry from propagating a static branch prediction to the instruction buffer when a dynamic branch prediction is generated for a branch instruction.

9. The method of claim 8 wherein the generation of a dynamic branch prediction involves referencing a branch prediction table containing entries for branch instructions previously resolved, and wherein the second branch prediction is a dynamic branch prediction, and wherein there is no entry in the branch prediction table for the first branch instruction, then generating a quasi-dynamic prediction for the first branch instruction, the quasi-dynamic prediction indicating the first branch instruction as being not taken.

10. The method of claim 1 wherein the microprocessor includes an instruction cache having an instruction cache line, indexed by the first instruction pointer, storing both the first and second branch instructions, the recycle stall being initiated if the both the first and second branch instructions are identified as being branch instructions.

11. The method of claim 10 wherein the microprocessor includes a branch prediction table having an entry for the first branch instruction, the branch prediction table entry including a double branch indicator identifying both the first and second branch instructions as branch instructions.

12. The method of claim 10 wherein the first and second branch instructions are each identified as being a branch instruction by static branch prediction circuitry.

13. Apparatus for generating respective branch predictions for first and second branch instructions, both indexed by a first instruction pointer, the apparatus comprising:

dynamic branch prediction circuitry to generate a branch prediction based on the outcome of previous branch resolution activity;

static branch prediction circuitry to generate a branch prediction based on static branch prediction information; and prediction output circuitry, coupled to the both the dynamic and static branch prediction circuitry, to output the respective branch predictions for the first and second branch instructions in first and second clock cycles; and recycle stall circuitry to initiate a recycle stall, during which the first instruction pointer is stalled, when the instruction pointer indexes the first and second branch instructions and when the first branch instruction is predicted as being not taken.

14. The apparatus of claim 13 wherein the static prediction information comprises a prediction for a branch instruction determined by a compiler at compilation of the branch instruction.

15. The apparatus of claim 13 wherein the prediction output control circuitry outputs the branch prediction for the first branch instruction in the first clock cycle, and to output the branch prediction for the second branch instruction in the second clock cycle and in response to occurance of the recycle stall in the first clock cycle.

16. The apparatus of claim 13 wherein the prediction output circuitry outputs the respective branch predictions for the first and second branch instructions to an instruction buffer in the same clock cycles that the first and second branch instructions are propagated to the instruction buffer from instruction fetch circuitry.

17. Apparatus for performing branch predictions for first and second branch instructions, both indexed by a first instruction pointer, the apparatus comprising:

branch prediction circuitry to generate first and second branch predictions for the first and second branch instructions respectively;

prediction output control circuitry, if the first branch instruction is predicted as being not taken, to:
the first branch prediction to an instruction buffer in a first clock cycle and in response to a recycle stall during which the first instruction pointer is stalled; and
propagate the second branch prediction to the instruction buffer in a second clock cycle.

18. The apparatus of claim 17 wherein the prediction output control circuitry includes recycle stall circuitry to initiate a recycle stall, during which the first instruction pointer is stalled, when the instruction pointer indexes the first and second branch instructions and when the first branch instruction is predicted as being not taken.

19. The apparatus of claim 18 wherein the recycle stall circuitry outputs a recycle stall signal during the recycle stall.

20. The apparatus of claim 18 wherein the branch prediction circuitry generates the first branch prediction, and the recycle stall circuitry initiates the recycle stall, in a first clock cycle.

21. The apparatus of claim 18 wherein the branch prediction circuitry generates the second branch prediction, and the recycle stall circuitry terminates the recycle stall, in a second clock cycle.

22. The apparatus of claim 18 including an instruction cache having an instruction cache line, indexed by the first instruction pointer and storing both the first and second branch instructions, the recycle stall circuitry initiating a recycle stall when the both the first and second branch instructions are identified as being branch instructions.

23. The apparatus of claim 22 wherein the dynamic prediction circuitry includes a branch prediction table having an entry for the first branch instruction, the branch prediction table entry including a double branch indicator identifying both the first and second branch instructions as being branch instructions.

24. The apparatus of claim 22 wherein the static prediction circuitry identifies both the first and the second branch instructions as being branch instructions.

25. The apparatus of claim 17 wherein the branch prediction circuitry includes dynamic branch prediction circuitry to generate a dynamic branch prediction based on the outcome of previous branch resolution activity, and static branch prediction circuitry to generate a static prediction based on static branch prediction information.

26. The apparatus of claim 25 wherein the static branch prediction information comprises a prediction for a branch instruction determined by a compiler at compilation of the branch instruction.

27. The apparatus of claim 25 wherein the dynamic branch prediction circuitry asserts a dynamic prediction valid signal on the generation of a dynamic branch prediction for either the first or the second branch instruction.

28. The apparatus of claim 25 wherein the static branch prediction circuitry is coupled to receive the dynamic prediction valid signal, and to be prevented from outputting a static branch prediction in response to the assertion of the dynamic prediction valid signal.

29. The apparatus of claim 25 wherein the dynamic prediction circuitry includes a branch prediction table containing entries for branch instructions previously resolved, and wherein the branch prediction circuitry generates a quasi-dynamic prediction for the first branch instruction if the second branch prediction is generated by the dynamic prediction circuitry, and if there is no entry in the branch prediction table for the first branch instruction, the quasi-dynamic prediction indicating the first branch instruction as being not taken.

30. The apparatus of claim 17 wherein the prediction output control circuitry propagates each of the first and second branch predictions to the instruction buffer in successive clock cycles.

31. The apparatus of claim 17 wherein the branch prediction circuitry generates the second branch prediction, and the prediction output control circuitry propagates the second branch prediction to the instruction buffer, in the same clock cycle when both the first and second branch predictions are generated by the static prediction circuitry.

32. A computer-implemented method of generating respective branch predictions for first and second branch instructions, both indexed by a first instruction pointer, the method comprising the steps of:

determining whether the first branch instruction can be dynamically predicted based on the outcome of previous branch resolution activity;

if the first branch instruction cannot be dynamically predicted, determining whether the second branch instruction can be dynamically predicted based on the outcome of previous branch resolution activity; and if the second branch instruction can be dynamically predicted, predicting the first branch instruction to be not taken.

33. A computer-implemented method of generating respective branch predictions, in a microprocessor, for first and second branch instructions, both of which are indexed by a first instruction pointer, the method comprising the steps of:

generating a first branch prediction for the first branch instruction; and if the first branch is predicted as being not taken, then:
in a first clock cycle, initiating a recycle stall during which the first instruction pointer is stalled;
propagating the first branch prediction to an instruction buffer in response to the initiation of the recycle stall;
generating a second branch prediction for the second branch instruction;
terminating the recycle stall; and
in a second clock cycle, propagating the second branch prediction to the instruction buffer in response to the termination of the recycle stall.

* * * * *

UNITED STATES PATENT AND TRADEMARK OFFICE
CERTIFICATE OF CORRECTION

PATENT NO. : 5,805,878
DATED : September 8, 1998
INVENTOR(S) : Rahman et al.

It is certified that error appears in the above-identified patent and that said Letters Patent is hereby corrected as shown below:

Column 20,
Line 42, delete "the" and insert -- propagate the --.

Signed and Sealed this

Fifth Day of August, 2003

JAMES E. ROGAN
*Director of the United States Patent and Trademark Office*